(12) United States Patent
Chun et al.

(10) Patent No.: US 11,942,079 B2
(45) Date of Patent: Mar. 26, 2024

(54) APPARATUS AND METHOD FOR PROCESSING DATA BETWEEN NEIGHBORS BASED ON ARTIFICIAL INTELLIGENCE TO PREVENT DISPUTE OVER NOISE TRAVELLING BETWEEN NEIGHBORS

(71) Applicants: Sungpil Chun, Seongnam-si (KR); Yongseob Lim, Daegu-si (KR)

(72) Inventors: Sungpil Chun, Seongnam-si (KR); Yongseob Lim, Daegu-si (KR)

(*) Notice: Subject to any disclaimer, the term of this patent is extended or adjusted under 35 U.S.C. 154(b) by 240 days.

(21) Appl. No.: 17/096,288

(22) Filed: Nov. 12, 2020

(65) Prior Publication Data
US 2021/0142793 A1    May 13, 2021

(30) Foreign Application Priority Data
Nov. 12, 2019  (KR) .................... 10-2019-0144049

(51) Int. Cl.
| | |
|---|---|
| *G06F 40/35* | (2020.01) |
| *G06Q 10/10* | (2023.01) |
| *G06V 40/10* | (2022.01) |
| *G06V 40/20* | (2022.01) |
| *G10L 15/06* | (2013.01) |
| *G10L 15/18* | (2013.01) |
| *G10L 15/22* | (2006.01) |

(Continued)

(52) U.S. Cl.
CPC .......... *G10L 15/1815* (2013.01); *G06Q 10/10* (2013.01); *G06V 40/10* (2022.01); *G06V 40/20* (2022.01); *G10L 15/063* (2013.01);

*G10L 15/22* (2013.01); *G10L 15/24* (2013.01); *G10L 25/51* (2013.01); *G06F 40/30* (2020.01); *G06F 40/35* (2020.01); *G10L 15/1822* (2013.01); *G10L 25/78* (2013.01)

(58) Field of Classification Search
None
See application file for complete search history.

(56) References Cited

U.S. PATENT DOCUMENTS

| | | | |
|---|---|---|---|
| 9,131,369 B2 * | 9/2015 | Ganong, III | ............ G10L 15/30 |
| 2008/0229424 A1 * | 9/2008 | Harris | .................... G06Q 50/18 |
| | | | 726/26 |

(Continued)

FOREIGN PATENT DOCUMENTS

| | | |
|---|---|---|
| KR | 10-1268318 B1 | 5/2013 |
| KR | 10-1582899 B1 | 1/2016 |

(Continued)

*Primary Examiner* — Richard Z Zhu
(74) *Attorney, Agent, or Firm* — Sughrue Mion, PLLC

(57) ABSTRACT

The present invention provides an artificial intelligence-based data processing apparatus and method using the same to prevent dispute over various kinds of inconveniences such as inter-floor noise occurring in an apartment house and to solve them in a friendly and communicative manner based on mutual consideration.

The AI-based data processing apparatus according to embodiments of the present invention can communicate with neighbors conveniently, quickly and accurately by voice, and communicate in a manner that does not offend each other as if it were through an unbiased mediator. By acting in consideration, it is possible to effectively prevent and resolve inter-floor noise related disputes.

15 Claims, 13 Drawing Sheets

(51) Int. Cl.
  *G10L 15/24*  (2013.01)
  *G10L 25/51*  (2013.01)
  *G06F 40/30*  (2020.01)
  *G10L 25/78*  (2013.01)

(56) References Cited

U.S. PATENT DOCUMENTS

| | | | | |
|---|---|---|---|---|
| 2010/0131328 | A1* | 5/2010 | DeLugas | G06Q 50/188 |
| | | | | 705/40 |
| 2011/0137653 | A1* | 6/2011 | Ljolje | G10L 15/183 |
| | | | | 704/E15.001 |
| 2012/0245934 | A1* | 9/2012 | Talwar | G10L 15/22 |
| | | | | 704/E15.005 |
| 2018/0068535 | A1* | 3/2018 | Chun | G08B 5/225 |
| 2019/0026066 | A1* | 1/2019 | Champy | G06F 3/162 |
| 2019/0121842 | A1* | 4/2019 | Catalano | G06F 40/247 |
| 2019/0180395 | A1* | 6/2019 | Moretti | G06N 20/00 |
| 2020/0065381 | A1* | 2/2020 | Chui | G06F 40/253 |
| 2020/0334772 | A1* | 10/2020 | Gorodeisky | G06Q 50/182 |
| 2021/0397793 | A1* | 12/2021 | Li | G06N 20/00 |

FOREIGN PATENT DOCUMENTS

| | | |
|---|---|---|
| KR | 10-1630308 B1 | 6/2016 |
| KR | 10-2017-0088233 A | 8/2017 |
| KR | 10-1795765 B1 | 11/2017 |
| KR | 10-1859282 B1 | 5/2018 |
| KR | 10-2020756 B1 | 11/2019 |
| KR | 10-2039820 B1 | 11/2019 |
| KR | 10-2085796 B1 | 3/2020 |

* cited by examiner

[FIG. 1]
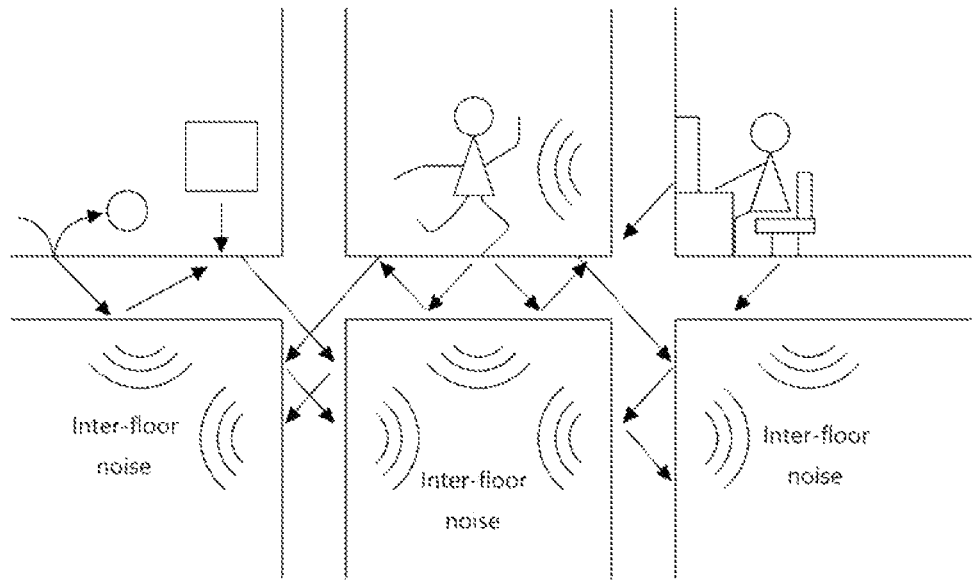
[FIG. 2]
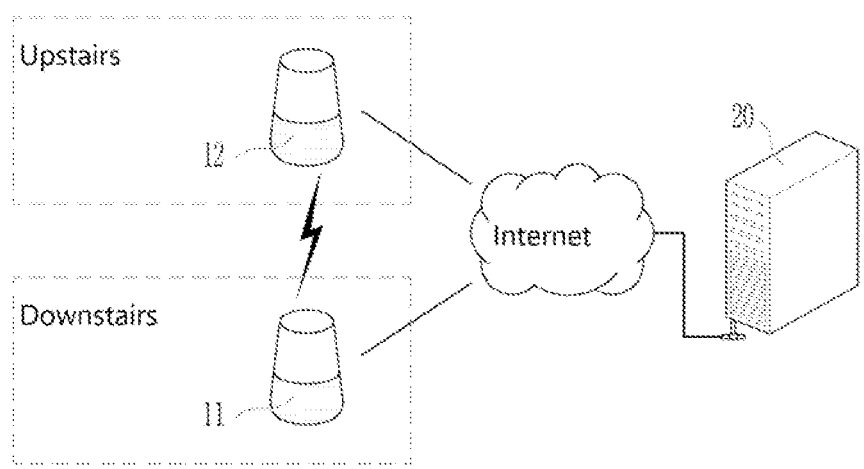

【FIG. 3】
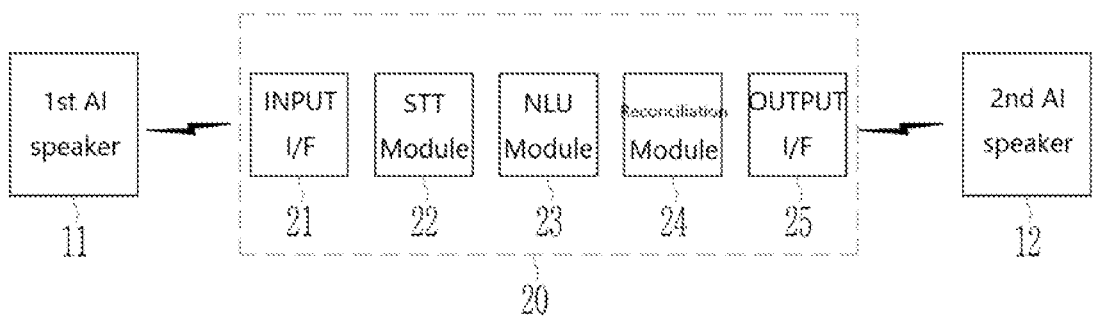
【FIG. 4】
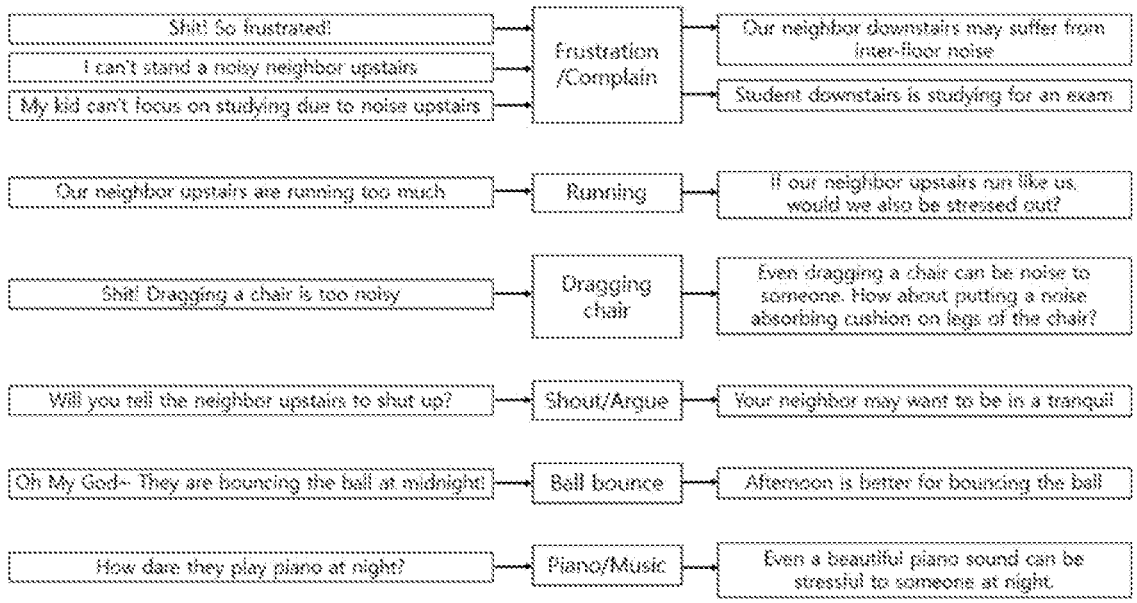

[FIG. 5A]
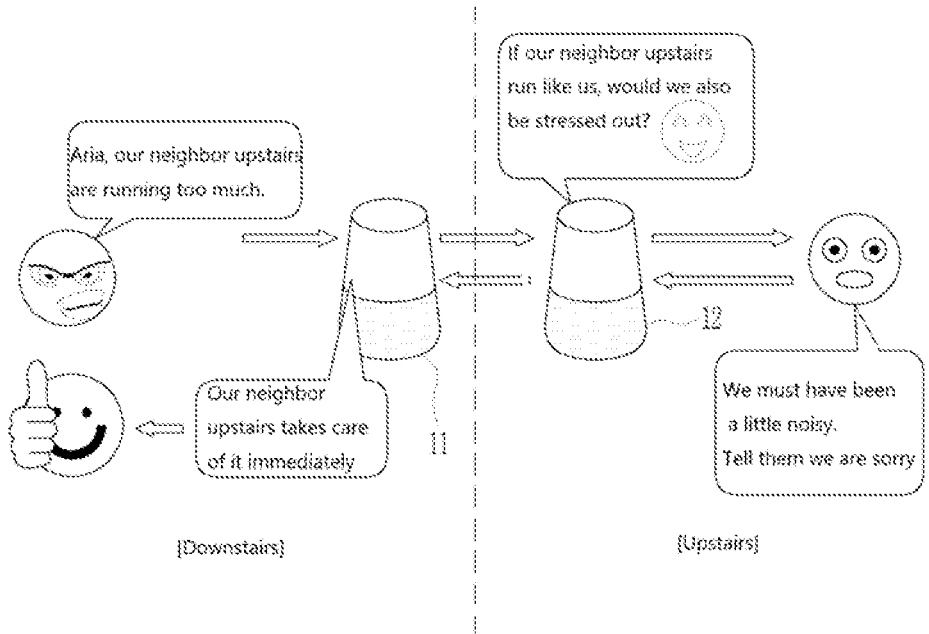
[FIG. 5B]
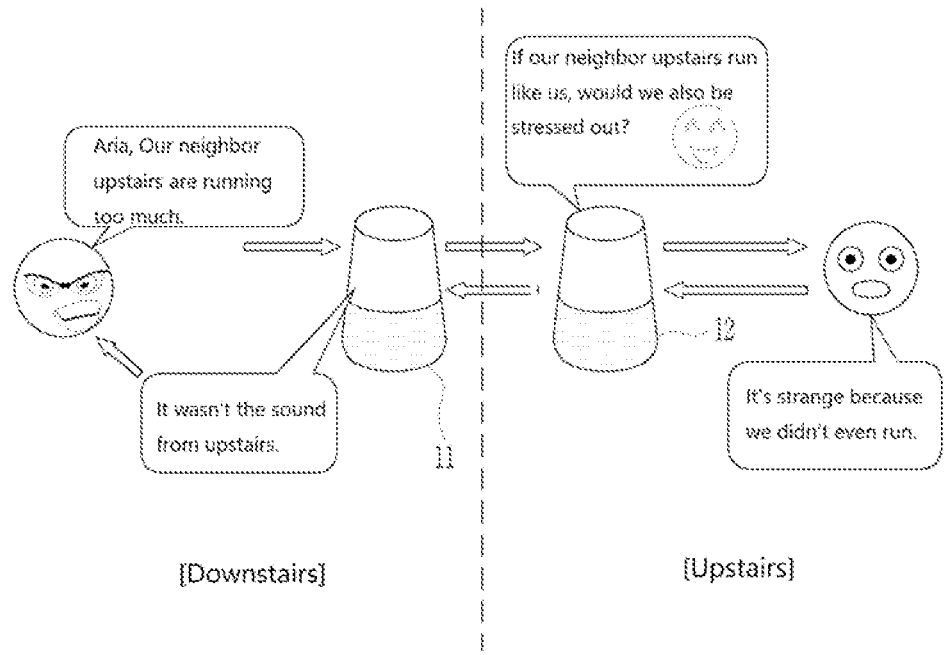

【FIG. 5C】
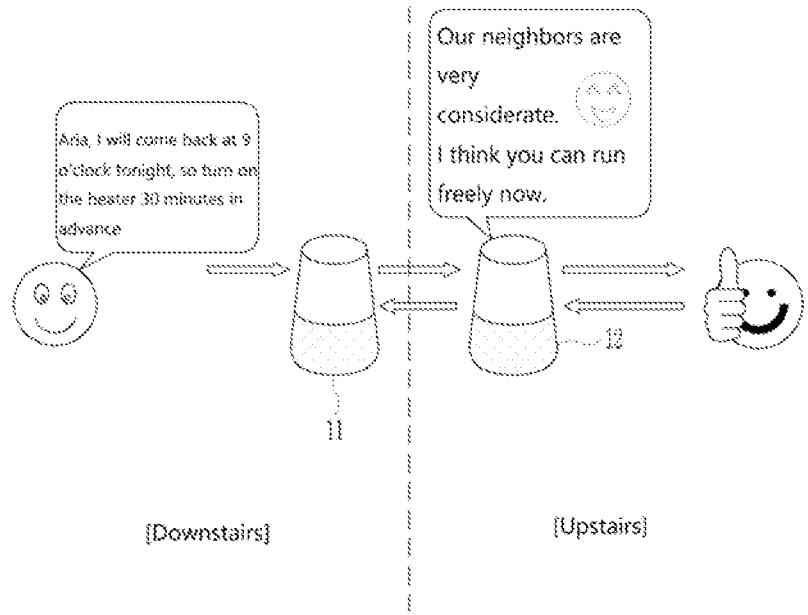
【FIG. 5D】
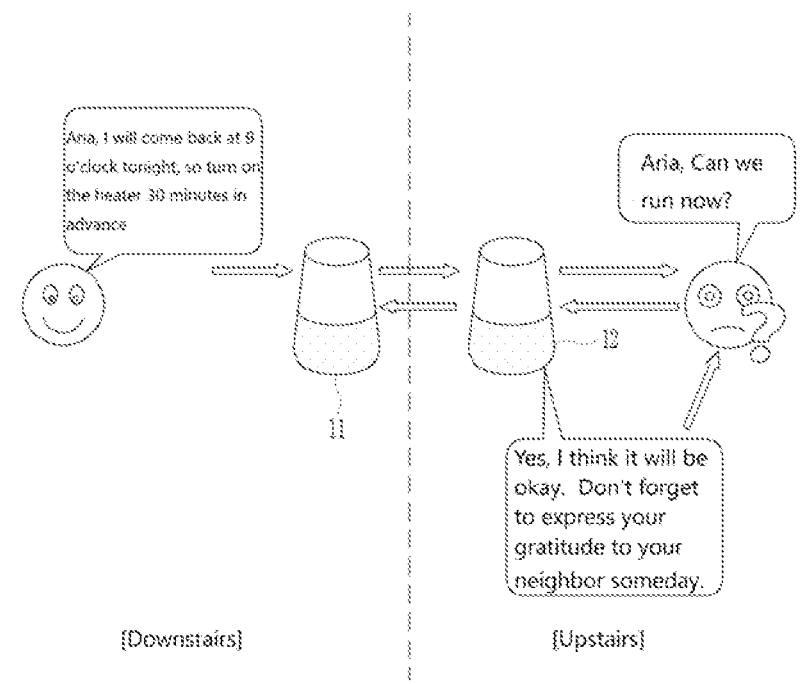

[FIG. 5E]
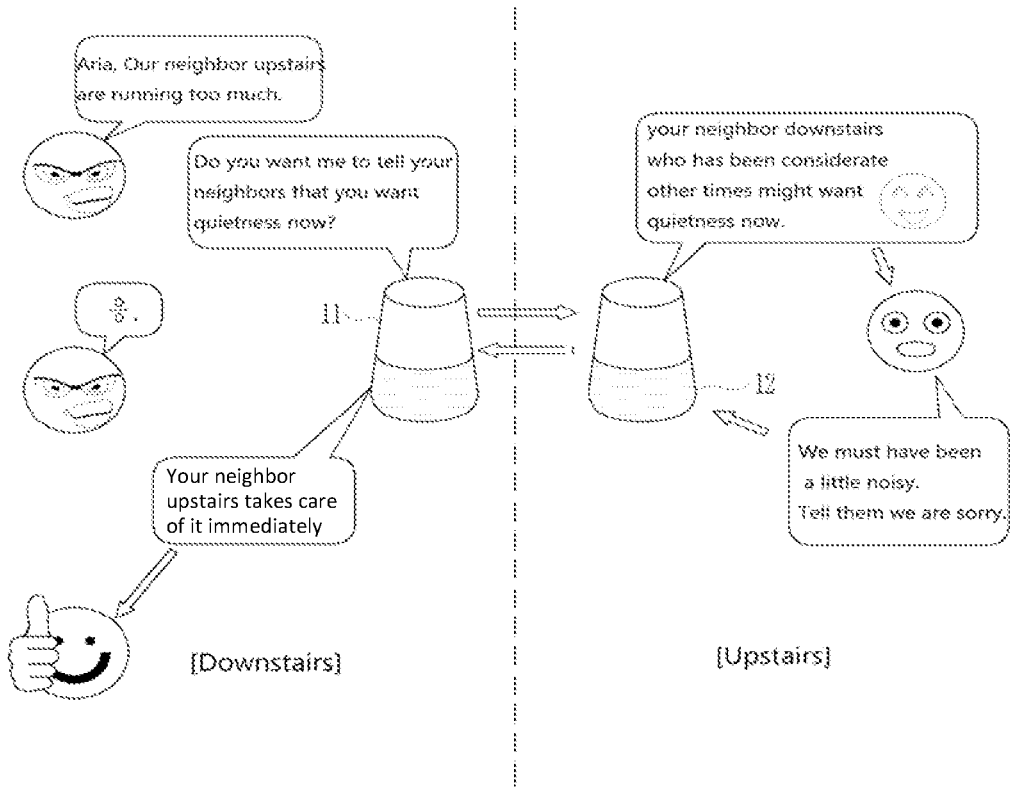
[FIG. 6]
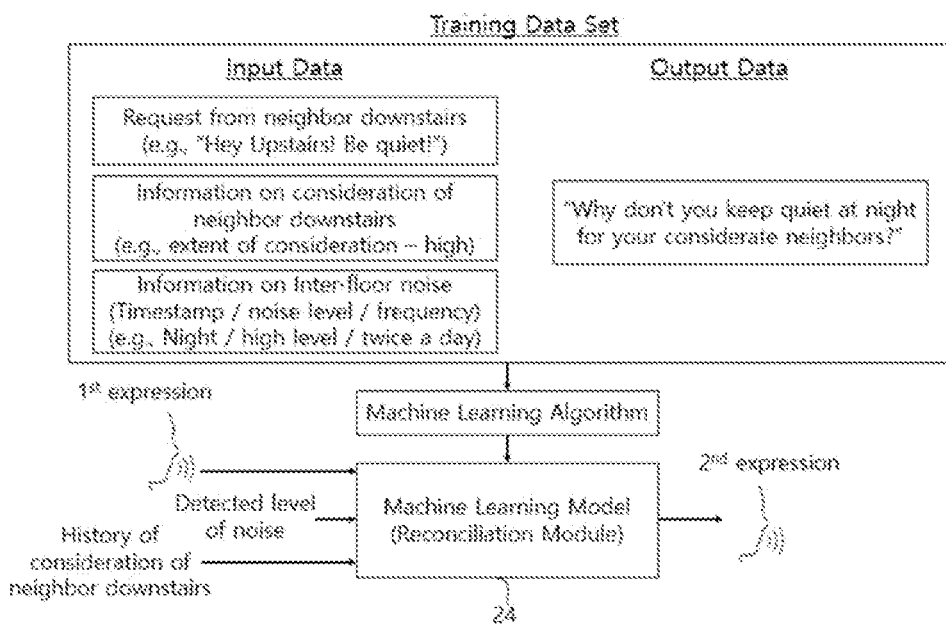

[FIG. 7]
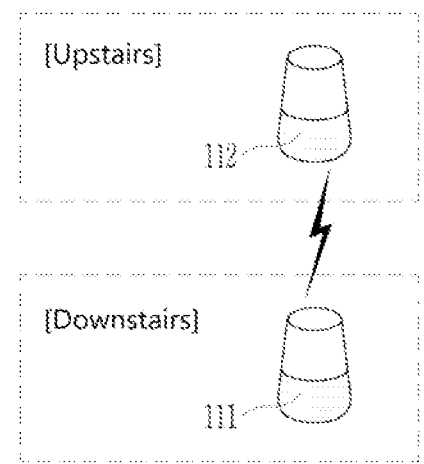
[FIG. 8]
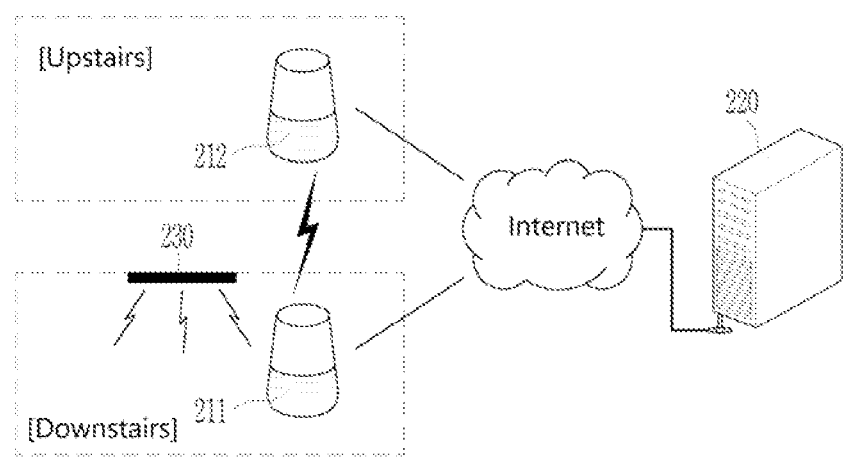

[FIG. 9]
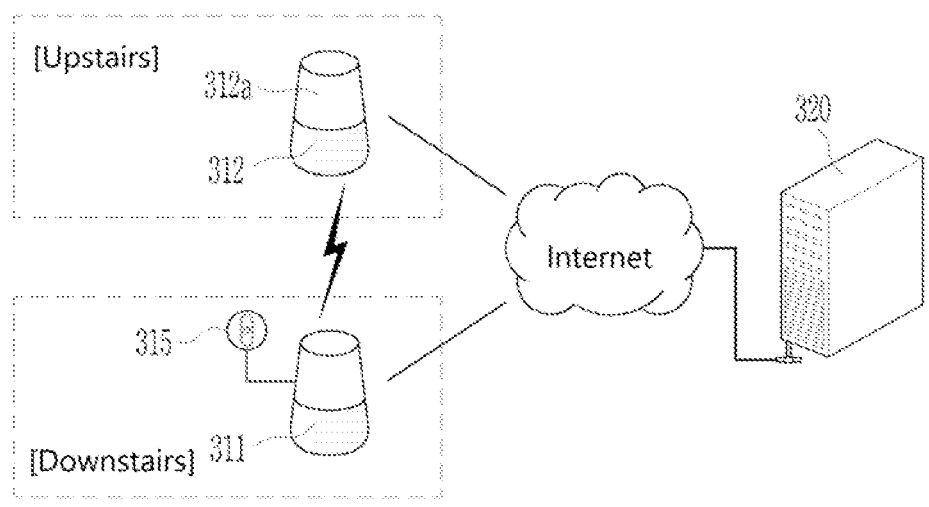

[FIG. 10]
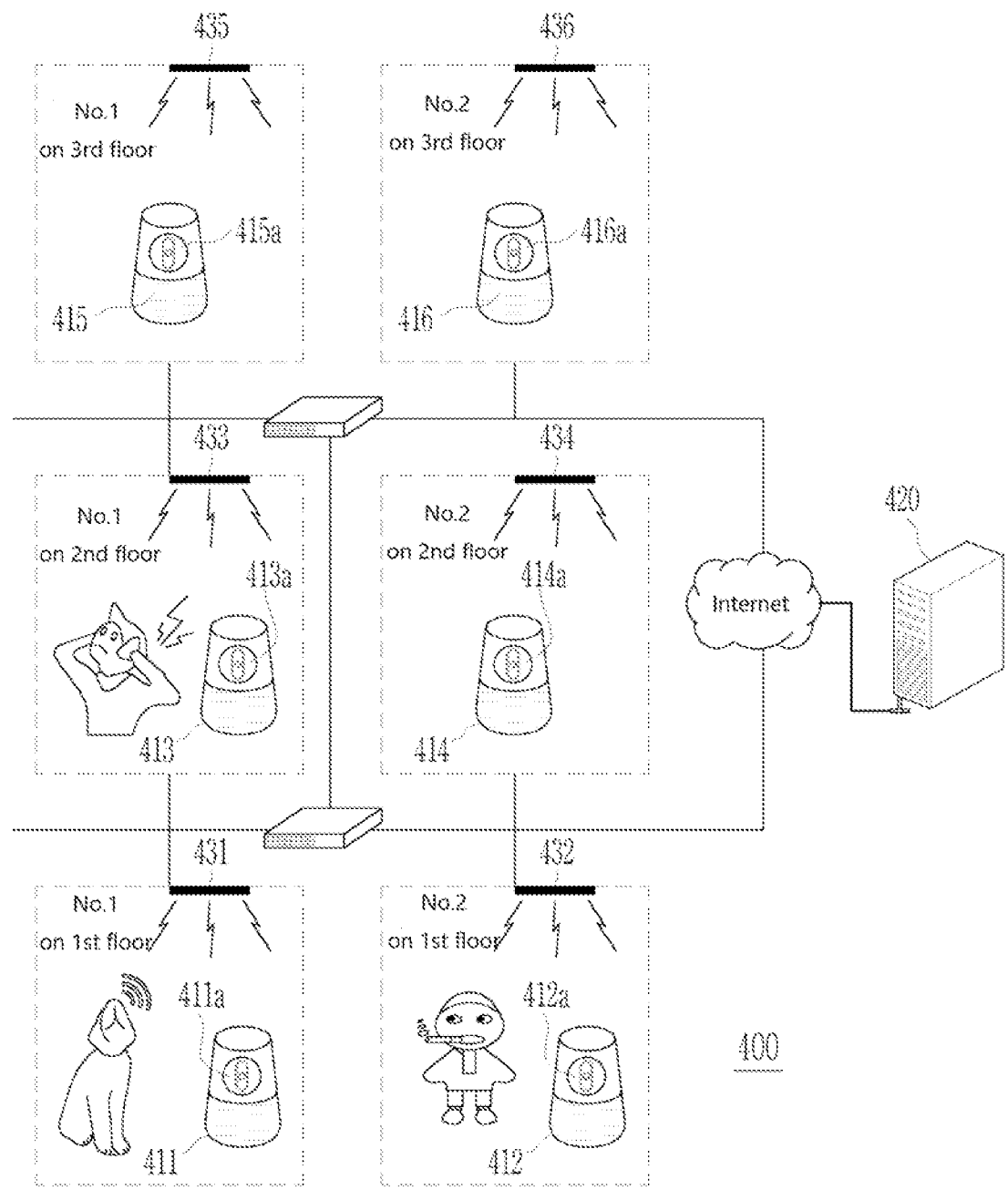

[FIG. 11]
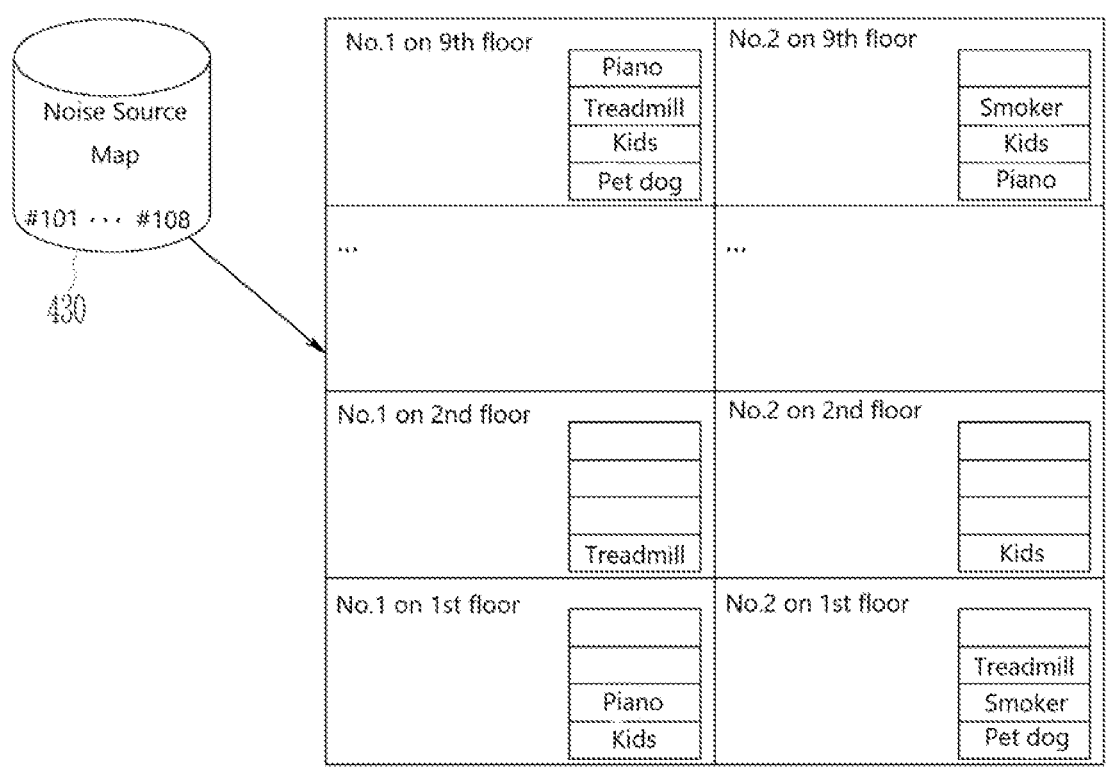

[FIG. 12]
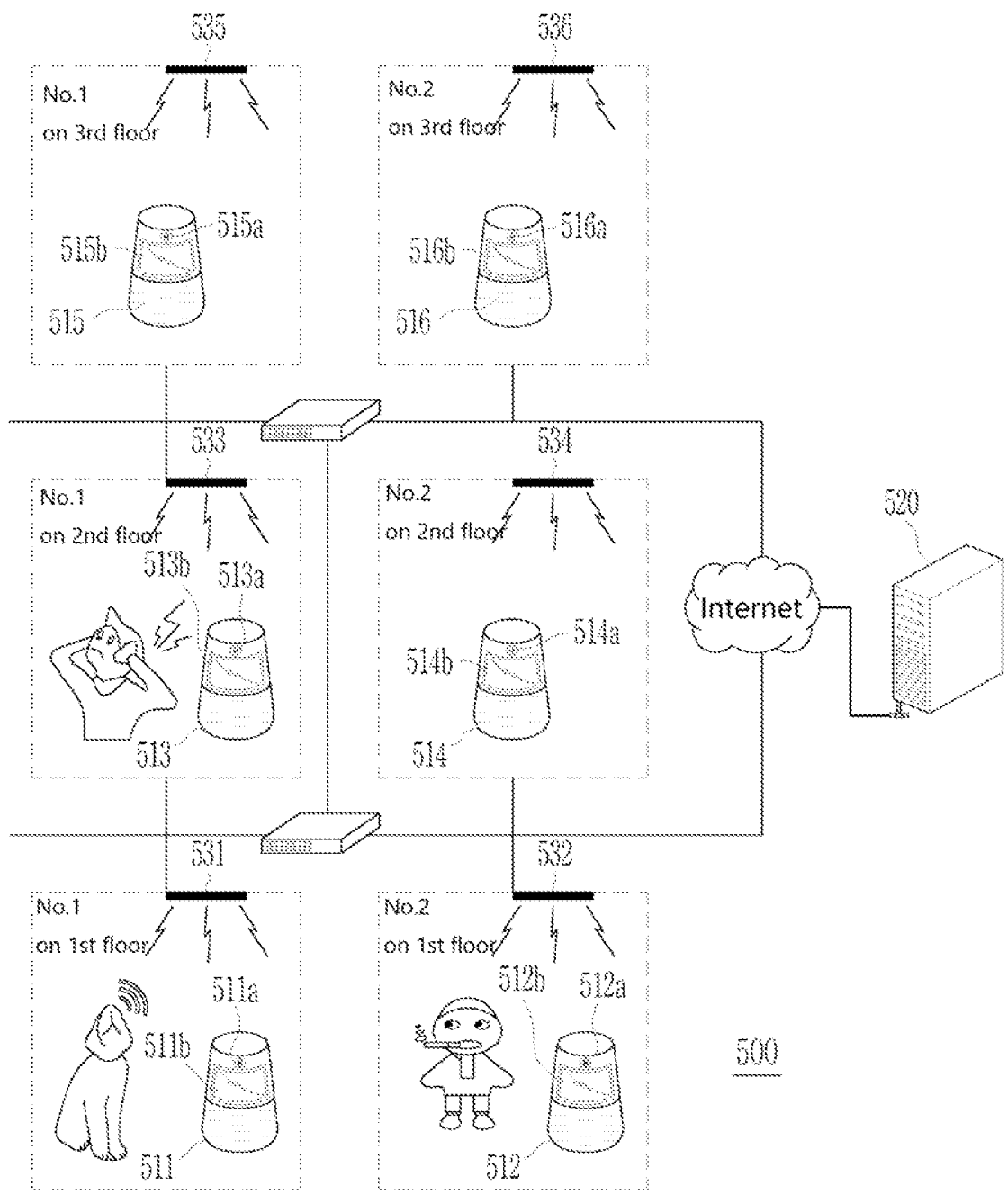

[FIG. 13]
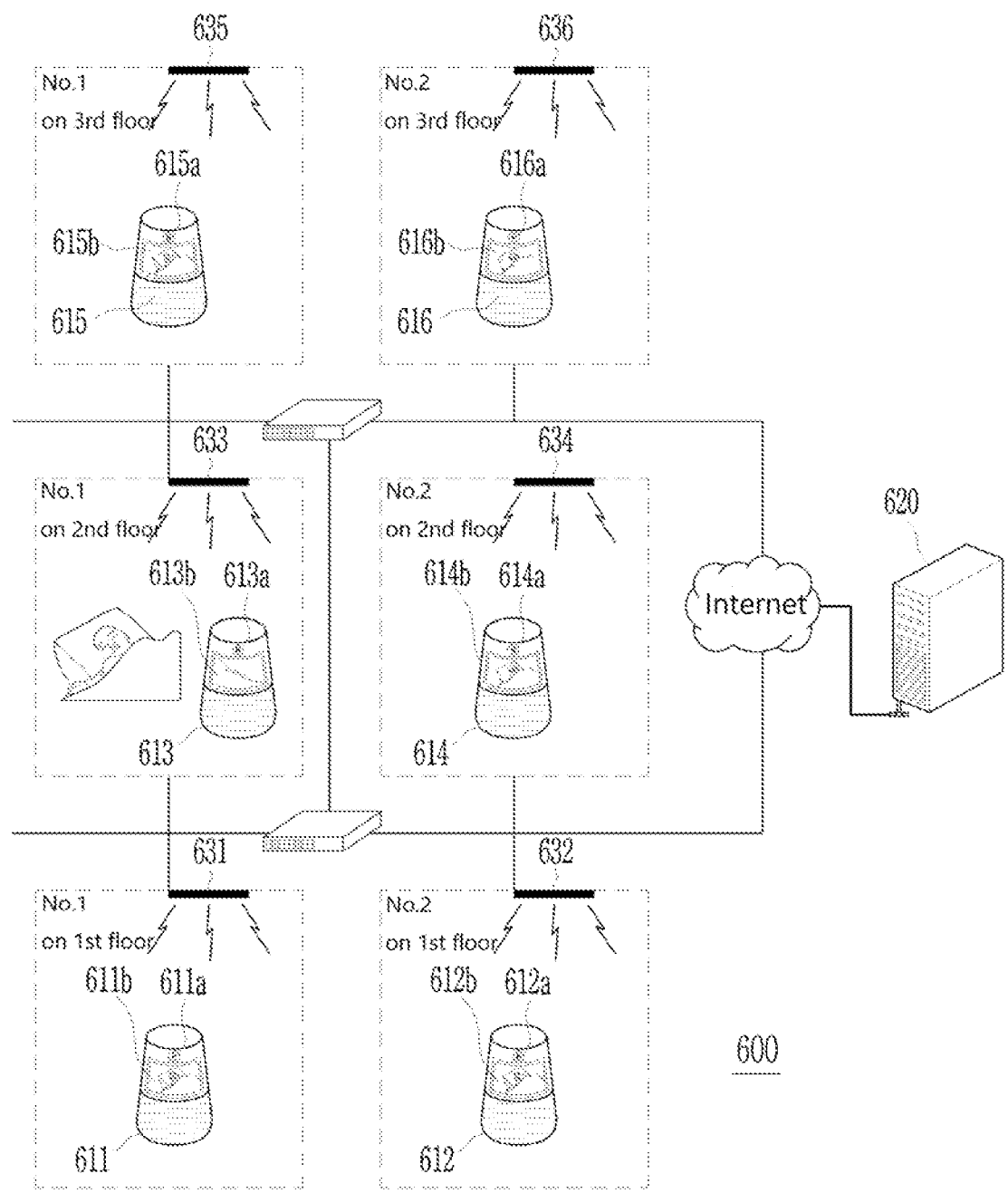

[FIG. 14]
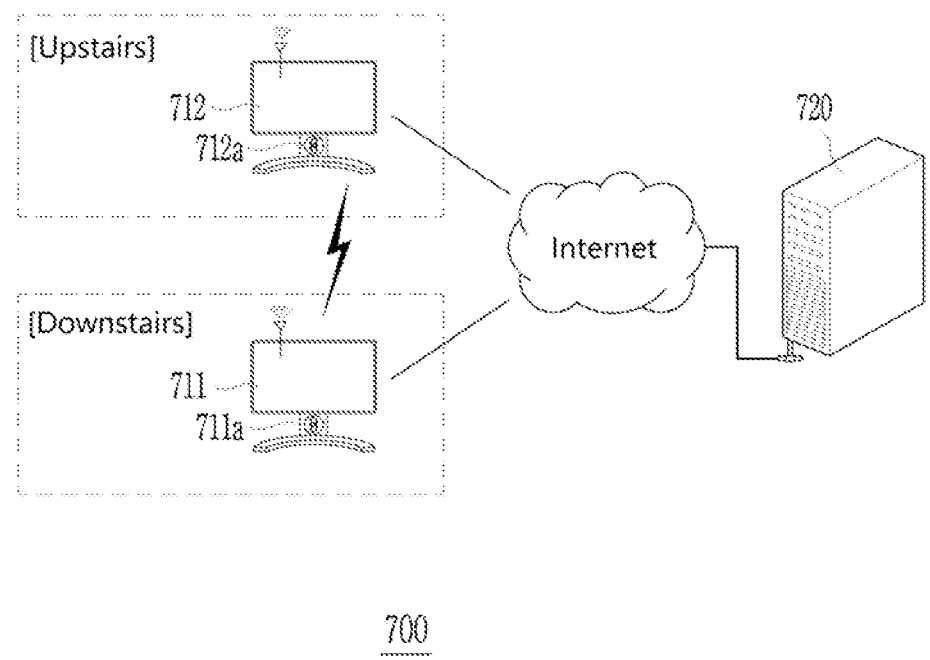
700
[FIG. 15]
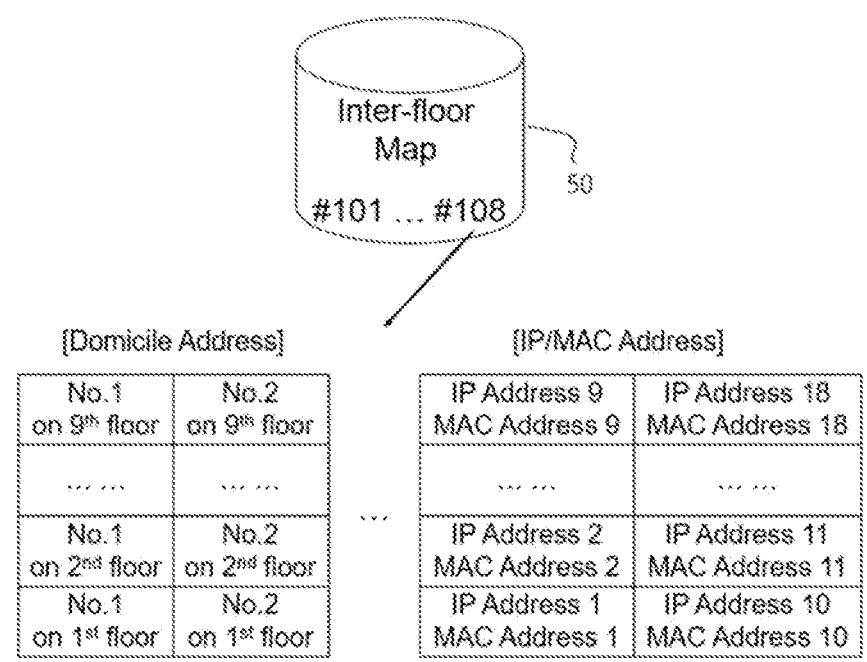

[FIG. 16]
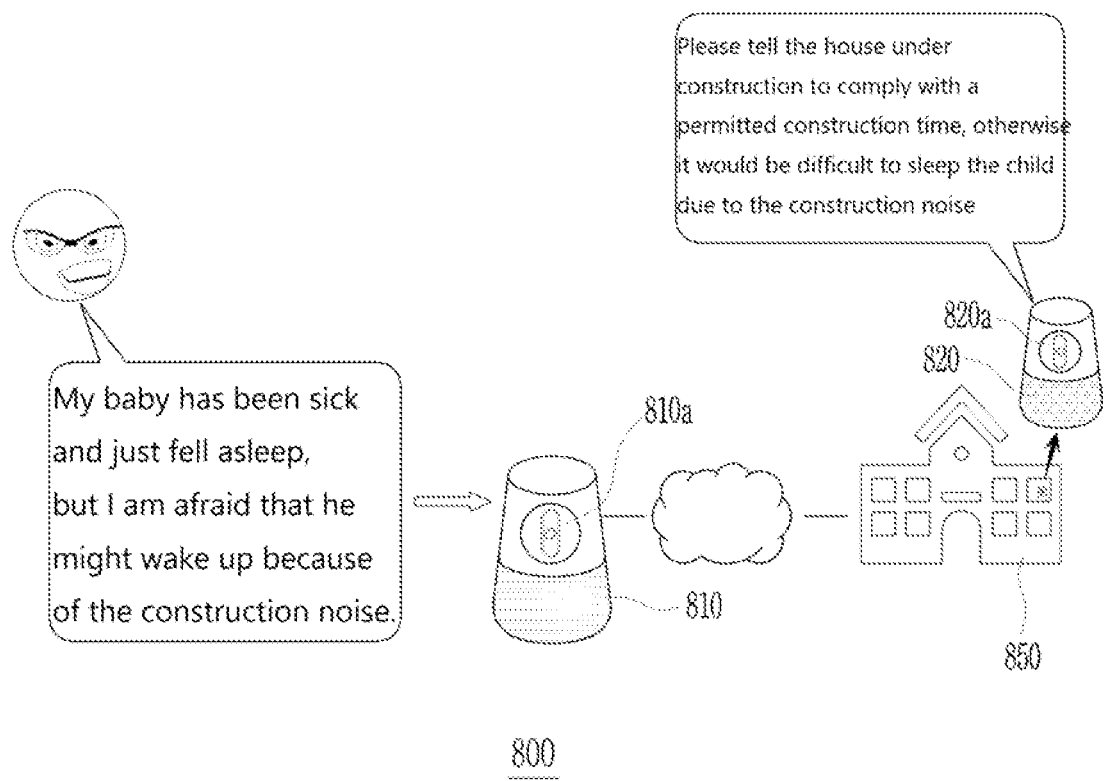

APPARATUS AND METHOD FOR PROCESSING DATA BETWEEN NEIGHBORS BASED ON ARTIFICIAL INTELLIGENCE TO PREVENT DISPUTE OVER NOISE TRAVELLING BETWEEN NEIGHBORS

CROSS-REFERENCE TO THE RELATED APPLICATION

This application claims priority from Korean Patent Application No. 10-2019-0144049, filed on Nov. 12, 2019, in the Korean Intellectual Property Office, the disclosure of which is incorporated herein in its entirety by reference.

BACKGROUND

1. Field

The present invention relates to an apparatus and method for processing data between neighbors to prevent and effectively resolve dispute between neighbors through mutual consideration for inconveniences such as floor noise in an apartment house.

2. Description of the Related Art

As described in the applicant's Korean Patent No. 10-1859282, disputes and mental stress due to inter-floor noise in neighboring apartment houses, such as apartments and condominiums, have recently emerged as a major social problem.

The types of floor noise include running noise, mechanical noise (e.g., a TV or washing machine), musical instrument sounds (e.g., a piano and violin) and door opening noise. In addition, there have been many disputes over discomfort happenings, such as smoking, barking and construction noise.

To solve these social problems, various methods were disclosed in the prior patent. For example, as a Korean patent, U.S. Pat. No. 1,548,932 (i.e., inter-floor floor material for preventing noise between floors), U.S. Pat. No. 1,142,119 (i.e., Apartment floor construction structure and construction method), U.S. Pat. No. 1,266,318 (i.e., inter-floor vibration and noise measurement alarm device), published patent No. 2015-0078964 (i.e., Floor noise notification device for public housing), U.S. Pat. No. 1,582,899 (i.e., Floor noise notification device for public housing), and the like. U.S. Patents include U.S. Pat. No. 8,359,957 and U.S. Patent Publication No. 2008-0144838.

The focus of the conventional patented technology is to enable the residents of the lower floor to know how much noise are generated from the upper housing is transmitted to the lower housing by measuring the floor noise and warn the occurrence of the floor noise to upstairs resident. This technique has the advantage of being able to objectively determine whether or not inter-floor noise has occurred. However, the disadvantage is that the inter-floor noise alarm is automatically transmitted to the upper housing even if there are no people on the lower housing. Another disadvantage is that there may be contention among neighbors about inaccuracy or reliability of the measured noise. In addition, it is problematic to cause a larger dispute over the inter-floor noise because they cannot feel each other's consideration toward the other. In other words, conventional patented technology cannot make the most of effect of mutual consideration between neighbors. For example, upstairs resident should always be worried about inter-floor noise being generated even when either downstairs resident is generous about the noise or absent.

Another conventional patent technology (e.g., Korean Patent Nos. 1,548,932 and 1,142,119) has a disadvantage that it must be installed when a new apartment is built. Korean Registered Patent No. 10-1859282, Korean Registered Patent No. 10-1548932, Korean Registered Patent No. 10-1142119, Korean Registered Patent No. 10-1266318, Korean Published Patent No. 2015-0078964, Korean Registered Patent No. 10-1582899, Korean Patent No. 10-1548932, Korean Patent No. 10-1142119, U.S. Pat. No. 8,359,957, U.S. Patent Publication No. 2008-0144838

"Study on how to revitalize the community for residents of public housing—focusing on resolving inter-floor noise disputes" (Sangmi Kang, Digital Design Studies, pp. 201-211, 2014)

We aim to provide apparatus and method to prevent disputes over inconveniences such as noise travelling between neighbors based on mutual generous consideration in a friendly and communicative manner.

SUMMARY

The artificial intelligence (hereinafter referred as "AI")-based apparatus according to an embodiment of the present invention includes a first communication device receiving the first data representing a state of a first neighbor for an inconvenience, and a second communication device outputting the second data to a second neighbor who is spatially separated from the first neighbor.

Here, the first data may be an expression representing the degree of acceptance of the first neighbor with respect to inter-floor noise. The second data may be generated by analyzing and extracting the meaning of the first data through the natural language understanding module, and converting it into another expression while maintaining the meaning through the reconciliation module. Alternatively, the second data may be an another expression as to acceptance of noise which excludes information on privacy such as absence or out-of-house. Above inconvenience may be an inter-floor noise caused by a neighbor.

The natural language understanding ("NLU") module and the reconciliation module may be incorporated into AI servers. Alternatively, they can also be incorporated into the first and the second communication devices.

The reconciliation module may convert the first data into the second data which is either (i) a more generous, softer or more polite or (ii) a privacy-free, dependening upon meaning of the first data. For instance, when the first data is to mean a request from a downstairs resident for calmness ("request mode for calmness"), the second data is an another expression which is more generous, softer or more polite. Alternatively, when the first data is to mean that a downstairs resident does or will not be bothered the inter-floor noise ("considerate mode") because the downstairs resident is not at a house or s/he feels like not being bothered by the noise, the second data is an another expression which does not include information on privacy of the downstairs resident.

The first and second data may be an audio data. Alternatively, they may also be a visual data. In a case where the second data includes both audio and visual data, the period during which the visual data is output is longer than that during which the audio data is output.

When the first data represents the considerate mode, the second data comprises at least the visual data which may be displayed until another first data is received.

The second data may be generated through the NLU module which analyses the meaning of the first data and the reconciliation module which converts into friendlier expression while maintaining the meaning.

The reconciliation module may include a trained AI model. Input data of data set for training the AI model comprises information related to a request of the first neighbor for calmness, information related to consideration of the first neighbor, information related to the occurrence of inconvenience caused, and/or information related to the reaction of the second neighbor to the output second data. The training data set can be extracted based on cases of inter-floor noise dispute mediation.

When the second data is output, the second communication device may automatically switch to an input standby state to receive feedback information from the second neighbor.

An embodiment of the present invention may further include at least one of an inter-floor noise sensor for measuring the magnitude of inter-floor noise generated in a second neighborhood living space and a camera module for capturing an image for image analysis. When the level of inter-floor noise detected by the sensor or the image analysis of the reaction of the first neighbor to the inter-floor noise satisfies a predetermined condition, the first communication device may automatically switch to the input standby state to receive the first data.

Each of the first and second communication devices may be operatively connected to a camera module with an image analysis function. The camera module connected to the first communication device may detect whether a person is in the lower housing, or may perform an image analysis of a reaction of the first neighbor to inconveniences caused by the second neighbor. The camera module connected to the second communication device may detect whether or not the second neighbor causes inconvenience.

When the inconvenience is the inter-floor noise, whether or not to output the second data to the second neighbor may vary depend on the inter-floor noise level detected by the inter-floor noise sensor.

The first communication device may be configured to convert the first data into the second data, present it to a first neighbor, and transmit it to the second communication device upon confirmation of the first neighbor.

At least one of a value detected by the inter-floor noise sensor, a detected time point, an analysis result of an image captured by the camera module, and the first data may be stored in a database, and may be used as evidence in case of a dispute regarding the inter-floor noise.

In order to process data between neighbors based on AI according to an embodiment of the present invention, a first communication device installed in a living space to which an inconvenience is transmitted and a second communication device requesting a suppression of the inconvenience may be paired and connected. The pairing connection may be configured based on a noise source map in which the possible sources of the inconvenience for each resident are stored, and the identification information of the first neighbor requesting a suppression of the caused inconvenience. In addition, an inter-floor information map in which identification information of residents or a living space and identification information of a communication device are associated and stored may be used.

The second data may be converted and generated from the first data in response to a query of the second neighbor about the degree of acceptance of the first neighbor for the inconvenience.

According to the embodiments of the present invention, it is possible to conveniently, quickly and accurately communicate in a way that does not offend each other between neighbors to prevent inter-floor noise dispute. The neighbors downstairs can acquire quietness by conveniently and promptly expressing the request for calmness to neighbors upstairs when they feel like being cared by the neighbors upstairs as much considerate care as they usually exercise to the neighbors upstairs.

In the considerate mode on lower living space, neighbors on the upper floor can escape from stress without worrying about causing inter-floor noise. In the mode of request for calmness, it is possible to adaptively control the noise-producing behavior by referring to the feedback on whether or not his behavior is causing inter-floor noise. In addition, since it is possible to identify a noise source based on objective information and transmit a request to refrain from causing the inter-floor noise, it may be possible to prevent an unfortunate neighbor who is incorrectly identified as a noise maker.

According to another embodiment of the present invention, it is possible to easily and quickly and accurately deliver a complaint by overcoming the shortcomings of face to face or in writing. In addition, for those who lack expertise in filing complaints, this embodiment can automatically compliment contents of the complaints through AI algorithms that were trained by relevant information or cases, and reconstruct them into convincing complaints. In addition, for those abusive complaints with prejudiced or subjective opinion, AI based data processing apparatus equipped with the reconciliation module can also provide complainants with a chance to reconsider to file the complaints, thereby preventing abuses of the complaints.

BRIEF DESCRIPTION OF THE DRAWINGS

FIG. 1 illustrates various types of inter-floor noises occurring in an apartment house.

FIG. 2 is a schematic diagram of an AI-based data processing apparatus between neighbors according to an embodiment of the present invention.

FIG. 3 is a block diagram showing the first application example in which the voice input to the first AI speaker is output to the second AI speaker through the AI server according to an embodiment of the present invention.

FIG. 4 illustrates the operation of the reconciliation module according to an embodiment of the present invention.

FIG. 5A to 5E illustrates examples in which communications between neighbors are conducted through an AI-based data processing apparatus between neighbors according to an embodiment of the present invention.

FIG. 6 illustrates a way of training the machine learning model of the reconciliation module.

FIG. 7 is a schematic diagram of an AI-based data processing apparatus between neighbors according to another embodiment of the present invention.

FIG. 8 is a schematic diagram of an AI-based data processing apparatus between neighbors according to still another embodiment of the present invention.

FIG. 9 is a schematic diagram of an AI-based data processing apparatus between neighbors according to still another embodiment of the present invention.

FIG. 10 is a schematic diagram of an AI-based data processing apparatus between neighbors according to still another embodiment of the present invention.

FIG. 11 is a schematic diagram of a noise source map in an apartment house.

FIG. 12 is a schematic diagram of an AI-based data processing apparatus between neighbors according to still another embodiment of the present invention.

FIG. 13 illustrates that the image of a sleeping baby is broadcasted on the display screen of an AI speaker at neighbor's house.

FIG. 14 is a schematic diagram of an AI-based data processing apparatus between neighbors according to still another embodiment of the present invention.

FIG. 15 is a schematic diagram of an inter-floor information map used for pairing connection among AI-based data processing apparatuses.

FIG. 16 illustrates an example in which an AI-based data processing apparatus according to another embodiment of the present invention is utilized.

DETAILED DESCRIPTION

The contents described below are only for embodiments of the present invention, but the present invention is not limited thereto. The terms used in this specification are only used to describe specific embodiments and are not intended to limit the present invention.

Hereinafter, embodiments of the present invention will be described in detail with reference to the accompanying drawings.

FIG. 1 shows various types of inter-floor noises occurring in an apartment house.

The sounds and vibrations when playing upstairs, dragging a chair, bouncing a ball, or dropping an object are usually transmitted to the lower living space. It may also be transmitted to the next floor on the same floor. Cigarette smoke can also spread upstairs. However, there are cases where it is unclear where noise will be travelled such as a barking dog or a musical instrument. Such inconveniences, including various types of inter-floor noises, are transmitted to one or more neighbors living in the apartment.

FIG. 2 is a schematic diagram of an AI-based data processing apparatus 10 between neighbors according to an embodiment of the present invention.

The apparatus may include a pair of devices 11 and 12. The devices 11 and 12 may be artificial intelligence speakers (hereinafter referred to as "AI speakers") having a voice recognition function, but may not be limited thereto. All of them may be provided as long as they have a communication function and a voice recognition function, and a function of receiving voice from a user and outputting sound and/or visual data to the user. Thus, the devices 11 and 12 each may include any one or combination of a digital modem, a radio frequency (RF) modem, a WiFi chip, and related software and/or firmware. For example, a smart phone, a voice recognition smart TV, and the like are also possible.

Hereinafter, the embodiment will be described taking an AI speaker as an example. The first AI speaker 11 may be installed in the lower housing and the second AI speaker 12 may be installed in the upper housing. Each of the AI speakers 11 and 12 may be connected to the AI server 20 through the Internet. The speaking of the inhabitants downstairs input to the first AI speaker 11 is understood and converted through the AI server into more polite, softer and friendlier expression and transmitted to the inhabitants upstairs through the second AI speaker 12. Thus, the residents upstairs can immediately recognize that their actions have caused inter-floor noise, and be considerate to the residents downstairs by not causing the inter-floor noise. Likewise, the speaking of the residents upstairs inputted to the second AI speaker 12 is understood and converted through the AI server into more polite, softer and friendlier expression and transmitted to the residents downstairs through the first AI speaker 11. The residents downstairs will appreciate this. In this way, it is possible to conveniently and quickly communicate between neighbors by voice based on natural language understanding. In addition, with the help of AI, one can make each other considerate and communicate with each other in a way that does not offend them.

FIG. 3 is a block diagram showing the first application example in which the voice input to the first AI speaker is output to the second AI speaker through the AI server according to an embodiment of the present invention.

The AI server according to an embodiment includes an input interface 21, a speech-to-text (STT) module 22, a NLU module 23, a reconciliation module 24, and an output interface 25. The STT module 22 recognizes a sound data of the voice and converts it into text data. The NLU module 23 understands the natural language in view of the meaning, tone, and nuances of the text data. The reconciliation module 24 is controlled to keep the original meaning, but transform the tone and nuances friendly and smoothly. In particular, this is the case when the original sound data from a downstairs resident was to request calmness. On the other hand, when the original sound data from a downstairs resident is in considerate mode, the reconciliation module 24 may be controlled to make expression which does not include information on privacy of the downstairs resident, i.e., whether or not being absent.

The reconciliation module 24 may be configured as a trained machine learning model or a rule-based model. The reconciliation module enables accurate processing as the training data sets increase or the rules become more subdivided. The STT module 22 and the determination module 23 may also be configured as AI models or rule-based models. There are many ways to create and use AI or rule-based models through publicly known technologies.

When the resident downstairs speaks the status information of the inter-floor noise, the first AI speaker 11 records it in an audio file (for example, MP4) and transmits it over the internet. The AI server 20 converts the sound data through the STT module 22 into a text data and understands its meaning through the NLU module 23, and inputs it to the reconciliation module 24. The reconciliation module 24 converts it into another expression and outputs it.

At least one of the above modules may be embodied as various numbers of hardware, software and/or firmware structures that execute respective functions described above.

For example, at least one of these modules may use a direct circuit structure, such as a memory, a processor, a logic circuit, a look-up table, etc. that may execute the respective functions through controls of one or more microprocessors or other control apparatuses. Also, at least one of these modules may be specifically embodied by a program, or a part of code, which contains one or more executable instructions for performing specified logic functions, and executed by one or more microprocessors or other control apparatuses. Further, at least one of these modules may include or may be implemented by a processor such as a central processing unit (CPU) that performs the respective functions, a microprocessor, or the like. Two or more of these modules may be combined into one single module which performs all operations or functions of the combined two or more modules. Also, at least part of functions of at least one of these modules may be performed by another of these modules.

As shown in the example of FIG. 4, the sound data delivered to the second AI speaker 12 through the AI server 20 is a softer, more polite or gentle expression than the original data. It should be understood that the softened expression presented here is exemplary, and various modifications are possible depending on the trained machine learning model and the situation in which it is used. For example, if the reconciliation module is trained with cases of the inter-floor noise dispute resolution, it can not only convert speech or text data received from a user into softened and smooth expressions, but it can also supplement helpful expression to help preventing the dispute in advance.

In an another embodiment, the AI server may be configured not to have a reconciliation module. In this case, the sound data of the voice of a neighbor is converted into a text data, understood as a natural language, and then converted into a machine voice and transmitted to the other neighbor. Although it may be less soft and courteous than the embodiment with the reconciliation module, exacerbated emotion of an original speaker may be prevented to be transmitted because the furious human voice is replaced by the calm machine voice.

In a yet another embodiment, the apparatus of the present invention may be controlled to transmit the sound data of the voice input to one AI speaker to the other AI speaker of the other neighbor. In this case, Although one can conveniently and quickly communicate with the other neighbors between floors, there is a disadvantage that emotions can be exacerbated.

A usage scenario of the present invention will be described with reference to FIG. 5A. When the inter-floor noise is generated from the upstairs, the resident downstairs speaks to the first AI speaker 11, "Aria!, running too much upstairs today". The first AI speaker 11 records the voice of a resident downstairs and transmits it to the AI server. The AI server opens the recording file and converts it into text through the STT module, and the NLU module converts it into semantic information and sends it to the reconciliation module. Then, the reconciliation module converts the semantic information into a softened expression such as "If our neighbors upstairs run like us, would we also be stressed out?" The second AI speaker 12, which receives the softened sound data, outputs it to the residents upstairs. Data such as the extent of acceptance and response by residents upstairs who heard this output can be continuously stored in the storage of an AI server or a separate server. In addition, the machine learning model of the reconciliation module can be trained with these data and select a more appropriate expression to be delivered to residents upstairs. This will be described in more detail with reference to FIG. 6 below.

When the residents upstairs who heard this said sorry, such as "we must have been a little noisy. Please convey that we are sorry," this statement may be fed back to the second AI speaker 12. Then, the AI server converts it into another expression, such as "our neighbor upstairs takes care of it immediately" and the first AI speaker 11 delivers it to the neighbor downstairs. It is also possible to select a more appropriate expression to be delivered to the neighbor by continuously storing and learning the stored data such as the extent of acceptance of residents downstairs and reaction of residents upstairs who was notified from the residents downstairs.

In this way, even when residents downstairs speak in an annoying tone, voice, tone, nuances and/or expressions can be softened and smoothly converted while maintaining the original meaning through the AI server. Therefore, neighbors upstairs who listen to it can easily accept the requests of the neighbors downstairs without provocation, and neighbors upstairs will tend to say sorry to neighbors downstairs more easily. While face to face or voice to voice communications between neighbors is easy to exacerbate emotions, communication in a friendly and polite fashion through AI speakers is more helpful not to exacerbate emotions as if neighbors between floors were mediated through experienced mediators. In addition, the AI enabled reconciliation module can draw the maximum consideration from neighbors upstairs by continuously learning and using the expressions most favored by the neighbors upstairs.

In addition, the input by voice of residents downstairs as to the extent of acceptance to the inter-floor noise i.e., a request mode for calmness or a considerate mode, is more convenient than the input by pressing a button manually.

In addition, the reconciliation module of the AI server can improve the ability to convert an original speech into an appropriate expression suitable for the situation as it is trained with big data, i.e., various examples of inter-floor noise disputes and resolutions. By doing so, it is possible to more effectively prevent and resolve disputes over inter-floor noise.

In addition, it is possible to deliver one's own state as to inter-floor noise more accurately and diversely by speaking in words, as opposed to the way by pressing a limited number of buttons.

When the second AI speaker 12 is called upon in a predetermined manner (for example, the name "Aria"), it wakes up and switches to a standby mode for receiving voice input. In order to improve convenience, the second AI speaker 12 may be configured to automatically switch to the standby mode if receiving the voice data transmitted from the first AI speaker 11. Residents upstairs can speak what they want without calling it "Aria," making conversation more natural.

On the other hand, although not illustrated in the drawings, the output to residents upstairs from the second AI speaker may be a visual information instead of the voice data or may be displayed simultaneously with the voice data. Here, the visual information may be a light of a specific color from a lamp on the AI speaker. For example, the AI speaker is usually turned on in green, and when a signal or message refraining from the inter-floor noise, it may turn red. The visual information may be displayed on a screen of the AI speaker. For example, when a signal requesting the refrain from the inter-floor noise is received, text and/or images and/or emoticons corresponding thereto may be displayed.

The usage scenario of FIG. 5B is that residents upstairs who are requested to refrain from making inter-floor noise were not the inter-floor noise source. Residents upstairs may say, for example, "it's strange because we didn't even run." This feedback from the residents upstairs may be appropriately converted through the second AI speaker 12, the AI server, and the first AI speaker 11 and transmitted to downstairs. For example, "It wasn't the sound from upstairs". In this way, the residents downstairs can immediately be corrected and the residents upstairs can get out of the suspicion. As such, it helps to prevent unnecessary suspicion between neighbors, and helps to maintain better relationship to be considerate to each other in the future.

The usage scenario of FIG. 5C is that resident downstairs is neither home nor is bothered by the inter-floor noise and so it is set to be considerate mode for neighbors upstairs. If the resident downstairs speak to the first AI speaker 11, such as "Aria, I will come back at 9 o'clock tonight, so turn on the heater 30 minutes in advance", the AI server will understand that no people downstairs come back until 9 o'clock. Then, the second AI speaker 12 can output a voice data such as "Our neighbors are very considerate. I think you can run freely now" or visual data. Here, as a visual data, the green lamp of the AI speaker may be turned on, and the expression may be displayed on the display screen of the AI speaker.

The expressions below may be understood as a considerate mode because resident downstairs leaves home. "Aria, I will go out and come back in the evening" "Aria, my family are leaving to watch movies now" "Aria, I'm going on a trip this weekend, but turn on the lights in a living room at night."

Similarly, the expressions below can also be understood as a considerate mode because the speaker does not care about inter-floor noise. "Aria, it is going to be noisy because of our guests coming over to my house today," "Aria, I'm vacuum cleaning from now on," "Aria, I feel good so I won't be bothered by running upstairs."

The second AI speaker 12 will just output to resident upstairs expression like "I think you can run now". This expression does not reveal information on privacy such as whether or not being home now. Thus, residents upstairs can know that his neighbor is in a considerate mode, but not know whether his neighbor is not home or does not care about the noise while being home. This prevents security of the neighbor from being threatened.

Residents upstairs can live a life without worrying about making inter-floor noise by recognizing that neighbor downstairs is in the considerate mode. In return, thanks to the consideration of the residents downstairs, it is easier for the residents upstairs to be more considerate to the residents downstairs.

The usage scenario of FIG. 5D is that residents upstairs are curious about the state of residents downstairs. For example, if the resident upstairs say like "Aria, can I run now?", the second AI speaker 12 queries to the first AI speaker 11 for the state of the residents downstairs. The first AI speaker 11 may collect the status information of the residents of downstairs, i.e., considerate mode or request-for-calmness mode, and then it transmits the status information to the second AI speaker 12. The second AI speaker 12 can express with a voice such as "Yes, I think it will be okay. Don't forget to express your gratitude to your neighbor someday" or a green light.

The following expressions are to query the state of residents downstairs. "Aria, tell me the inter-floor noise mode for now" "Aria, is it a time to be quiet for now?" "Aria, if we run now, will our neighbor downstairs mind?"

The following expressions are examples that can be understood as a considerate mode of residents downstairs. "I think it's okay until at least 9:00," "It is okay because it is now in the considerate mode."

On the other hand, the following expressions are examples that can be understood as a request-for-calmness mode. "Our neighbor downstairs who are usually considerate wants to stay quiet now."

On the other hand, the first AI speaker 11 can determine the state of residents downstairs as to inter-floor noise in various ways. First, it can be determined based on statements of the residents downstairs to the first AI speaker 11. For example, it can be determined as a considerate mode from the statements "Aria, I am leaving home and will come back around 9 pm, so turn on the heater 30 minutes before." Second, it is possible to determine whether there is a person in the house or on which state s/he is by analyzing images acquired by a camera installed in or communicatively connected to the first AI speaker 11 or sound source. Third, it is also possible to determine based on information detected by various IoT sensors installed in the house downstairs. It is also possible to appropriately combine the above three methods to determine the state of residents downstairs as to the inter-floor noise.

Usage scenario of FIG. 5E is that when residents downstairs complain of discomfort or request to refrain from making inter-floor noise, the first AI speaker 11 understands the statements of the residents downstairs and presents the sentence to be delivered to the residents downstairs for confirmation before delivering to a neighbor upstairs. If a resident downstairs say, "Aria, running too much upstairs today," the first AI speaker 11 asks back, "Do you want me to tell your neighbors that you want quietness now?," then the resident downstairs answers "yes." In this case, the first AI speaker 11 records the conversation with the residents downstairs and sends it to the AI server, and the AI server converts it into an appropriate, softened or moderate expression to the second AI speaker 12 such as "your neighbor downstairs who has been considerate other times now wants quietness." If the neighbor upstairs says, "We must have been too noisy. Please tell that I'm sorry," the first AI speaker 11 who received this from the second AI speaker 12 delivers messages "your neighbor upstairs takes care of it immediately" to the resident downstairs. By communicating in a mutually considerate manner as above, it is possible to effectively prevent inter-floor noise disputes.

FIG. 6 illustrates a way of training the machine learning model of the reconciliation module.

FIG. 6 shows how a first expression is converted into a second expression which is euphemistic, soft, and/or polite by the reconciliation module 24. The machine learning model in the reconciliation module can be generated and updated by continuously learning to obtain a desired second expression in response to information related to the first expression. The training data set consists of input and output data. For example, the input data may include request-for-quietness of residents downstairs, degree of consideration of the residents downstairs, information related to inter-floor noise and/or feedback from residents upstairs. If the first expression as the input data is a little nervous or annoying expression that asks to refrain from making inter-floor noise, like "Hey, upstairs. Be quiet" the second expression as the output data softens the first expression, for example, "Why don't you keep quiet at night for your considerate neighbors?" Preferably, the second expression is an expression that appropriately draws attention of residents upstairs by conveying the message to keep quiet, but does not hurt feeling of the residents downstairs.

Meanwhile, when the first expression is "I'm leaving and will come back around 9:30 in the evening and turn on the heater 30 minutes before," the second expression may be "You can run freely now". Thus, privcay data of neighbor is not revealed in the second expression. The more the machine learning model of the reconciliation module learns with a training data set, the more accurate it can be.

As shown in FIG. 7, each of the first and second AI speakers 111 and 112 according to another embodiment of the present invention may incorporate the function of the AI server illustrated in FIG. 3 such as the STT module, NLU module, and reconciliation module.

Meanwhile, it should be understood that the embodiments of FIGS. 5A to 5E include cases in which the first and second AI speakers 11 and 12 are directly connected as shown in FIG. 7 or connected through the AI server as shown in FIG. 2.

The AI speakers 211 and 212 according to another embodiment of the present invention shown in FIG. 8 are different from the previous embodiments in that they are connected with the vibration/noise sensor 230.

The vibration/noise sensor 230 means a sensor that measures at least one of vibration and noise. The vibration/noise sensor 230 may be installed on the wall or ceiling of the lower floor, and may be functionally connected to the first AI speaker 211 and/or the second AI speaker 212. For example, when the vibration/noise sensor 230 linked to the first AI speaker 211 detects vibration or noise exceeding a predetermined reference (e.g., 50 dB), the detection signal is sent to the first AI speaker 211 and the first AI speaker 211 wakes up and switches to a stand-by state in which voice can be input.

User convenience is increased because uncomfortable residents by inter-floor noise can talk about their status or request for quietness immediately even without calling up the first AI speaker 211. If the vibration/noise sensor 230 is operationally connected with the second AI speaker 212, when the vibration/noise exceeding the reference value is detected, it may be configured to output the report to the second AI speaker 212. As a result, residents upstairs can immediately recognize generation of the noise and try to correct it themselves. In addition, in response to the inter-floor noise, if there is no request for quietness from neighbors downstairs, residents upstairs will appreciate the consideration of the neighbors downstairs. A series of information on the consideration of the neighbors downstairs can also be stored and used to train the model so as to control the level or extent of the second expression according to the information in response to the inter-floor noise that is later generated. For example, let's suppose that even though it was noisy upstairs in the evening of the last weekend, the neighbors downstairs took care of this. But if the inter-floor noise occurs again on this weekend evening again and neighbors downstairs requested to refrain from making the noise, the AI server 220 (including the expression softening module) can convert the expression of the request into "Would you give your neighbor downstairs a favor of being a little quieter today because your neighbor has been considerate last time?" and can deliver it to the second AI speaker 212.

As another example, expression output from the first and/or second AI speakers 211, 212 may be adjusted according to the situation based on the currently detected vibration/noise value and/or the previous sensed value stored (e.g., inter-floor noise generation time, noise level, frequency and pattern of occurrence, number of request for quietness, etc.). For example, the rarer the frequency of inter-floor noise is, the smoother the tone or expression is conveyed to neighbor upstairs. On the other hand, the more frequently is the request for quietness or the higher is the vibration/noise value, the tone or expression conveyed to neighbor upstairs may be adjusted to be stronger. If a request for quietness is received even during a daytime or even when the detected vibration/noise value is lower than the reference, or the request for quietness is too frequently received, then the reconciliation module may determine whether the request for quietness is abusive and, if determined so, may control the first AI speaker 211 to recommend the residents downstairs to reconsider the request for quietness.

On the other hand, inter-floor noise related information (e.g., inter-floor noise type, occurrence time, noise level, request for quietness, and behavior pattern between neighbors including considerate mode, etc) collected from various sensors including the AI speakers 210, 220 and the vibration/noise sensor 230 can be stored in AI server 220 or a separate server (not shown) for various purposes. For example, they may be used as evidence in inter-floor related disputes, or as an indicator of vulnerability of apartment to inter-floor noise based on information on the frequency of request for quietness. It can be used as a data to identify resident who are sensitive or considerate as to the inter-floor noise. As a result, this invention can contribute to promote reciprocal consideration between neighbors and so settle a comfortable living culture. Apparatus according to another embodiment of the present invention shown in FIG. 9 is different from the embodiment of FIG. 2 in that it includes cameras 315 and 312a. Here, the camera may be a separate camera 315 functionally connected to the AI speaker 311 or a camera module 312a embedded in the AI speaker 312.

When the residents downstairs are frowning, the camera 315 of the first AI speaker 311 can recognize the facial expression by video analysis with a deep learning algorithm. Therefore, it is possible to know the psychological state of the residents downstairs as to the inter-floor noise, and transmit the state to the second AI speaker 312 without receiving a separate request or input from the residents downstairs.

The camera 312a of the second AI speaker can analyze the state of the upper space, such as whether there is a person running or not, by video analysis. If it is determined that a person on the upper floor is absent or has no loud behavior at the time when the inter-floor noise occurs, the information that neighbors upstairs are not a noise source may be conveyed to residents downstairs through the first AI speaker 311.

In particular, it can be used as evidence in case of an inter-floor noise dispute by storing the image of the upper floor together with a timestamp, vibration/noise value, and state of the residents downstairs.

The apparatus according to another embodiment of the present invention shown in FIG. 10 includes a vibration/noise sensors 431, 432, 433, 434, 435, 436 and/or cameras 411a, 412a, 413a, 414a, 415a, and 416a connected or embedded in the first and second AI speaker for each house.

Suppose that there was a loud barking noise from a house on the 1st floor. It may be difficult to tell which house this sound came from among neighbors on the same floor, neighbors upstairs or downstairs. The same goes for the sound of piano playing and shouting.

Since the inter-floor noise upstairs is generally transmitted to the lower floor, AI speakers 411, 412, 413, 414, 415, and 416 on the upper floor and lower floor are paired and connected with each other. However, in the case of noise such as sounds of barking or piano, it will be necessary to know the location of the noise source for the connection.

To this end, vibration/noise sensors 431, 432, 433, 434, 435, 436 and/or cameras 411a, 412a, 413a, 414a, 415a, 416a in each housing may be used. Noise source can be located by analyzing and comparing results measured by the vibration/noise sensors installed in each housing 431, 432, 433, 434, 435, 436. Sound of a dog barking can be located by image analysis using cameras installed at each housing 411a, 412a, 413a, 414a, 415a, and 416a at a time when the vibration/noise sensors 431, 432, 433, 434, 435, and 436 detect the sound. The image analysis may be performed on each of the cameras, or transmitted to a separate server (not shown) and performed on the server. For privacy protection, only the analysis results can be stored and used, and images will not be saved. Information on the location of the noise source can be transmitted to AI speakers 411, 412, 413, 414, 415, 416 connected to the same network. Analysis of the location of the noise source may be performed by a predetermined algorithm, and this algorithm may be embedded in the AI server 420 as described above, or alternatively, it may be implemented in a separate management server (not shown).

By doing so, the AI speaker 413 in a living space in which the request-for-quietness is made and the AI speaker 411 of another living space in which the noise was generated may be configured to communicate with each other. This not only makes it much simpler and quicker to identify in which living space the noise was generated, but also makes it easier and faster to communicate. Since the request-for-quietness is transmitted to a house identified as a noise source based on objective information, it can prevent a neighbor who did not generate the noise from being identified as the noise source.

In another embodiment, when multiple requests-for-quietness are simultaneously made from several neighbors for the same noise, contents to be delivered to the AI speaker 411 of the house identified as location of the noise source may be generated according to the situation. For example, if the request-for-quietness is received from three neighbors (House #201, #102, #202) with respect to the barking of a dog, the expression "Since it seems that many neighbors feel uncomfortable, why don't you take good care of your dog?" can be output to the AI speaker 411.

If the vibration/noise sensor 431 or the camera 411a of the house #101 is turned off or malfunctions, it may be impossible to detect the vibration/noise. This problem can be solved by the AI server 420 or a separate management server having generated the noise source map 430 for the apartment as shown in FIG. 11.

The noise source map 430 is prepared to easily and accurately identify sources that cause various inconveniences occurring in the apartment house, such as barking sounds, musical instrument sounds, smoking, children jumping, treadmill sounds, and the like. The noise source map 430 may include information on noise source such as whether there is a pet dog, a piano, a smoker, young children living, or a treadmill for each of neighbors.

Information on the noise source for each house can be collected in a variety of ways. It can be collected from residents of each household when signing up for a service using the AI-based data processing apparatus of the present invention. Or, by analyzing information that has been asked to refrain from certain types of discomfort, a particular house with the highest probability may be set as the corresponding noise source. Alternatively, the image captured by the camera in the house may be analyzed to obtain and provide information on the noise source. Alternatively, it can be obtained from registration information of various IoT sensors installed in the house.

If the noise source map 430 is used, it is easy to identify the noise source even if it is neither possible to measure vibration/noise in real time for each resident nor to analyze images by a camera. For example, when complaints about dog barking are received from the house #202 and house #101, it can be easily determined that the house #102 is likely to be a noise source by searching the nearest household to the complaints from the noise source map 430.

In the embodiment of FIG. 12, the AI speakers 511, 512, 513, 514, 515, and 516 are provided with display screens 511b, 512b, 513b, 514b, 515b, and 516b. When receiving a request to refrain from generating the inter-floor noise from the AI speaker 513 in the neighborhood, emoticons, avatars, or characters are displayed on the display screen 511b of the AI speaker 511 to make a recipient neighbor feel friendly and to explain the situation easily and conveniently. For example, when the request for restraint is received from several neighbors regarding the barking of a dog, a voice saying "Because several neighbors seem to be uncomfortable, can you check whether your dog is nervous or not?" may be output through the AI speaker 511. On the display screen 511b, the appearance of the owner petting the puppy may be displayed in the form of an avatar. For the house causing the noise, it is possible to use the emoticons and the like to provide feedback representing a feeling of apology. By doing so, it is possible to effectively prevent inter-floor noise related disputes by transmitting emotions which is softened and friendly when communicating between neighbors.

In the embodiment of FIG. 13, avatars, pictures, photos and others depicting the situation of the person who wants to acquire a quiet situation from the neighboring house can be broadcasted to AI speakers 611, 612, 614, 615, and 616 of neighbors on the network so that it can be displayed on the display screens 611b, 612b, 614b, 615b, and 616b. For example, when a baby who has just fallen asleep, the mother asks the AI speaker 613, "Aria! our baby is asleep, so kindly tell our neighbors to be considerate for our baby's nice sleep." Alternatively, parents of students who are studying for important exams may make a similar request through the AI speaker.

Then, the AI speaker 613 may find a figure or picture suitable for this situation and transmit it to the connected AI speakers 611, 612, 614, 615, and 616 of the neighboring house, and output a voice that wants to acquire quietness. Disputes over the noise can be prevented because broadcasted neighbors will be careful not to cause the inter-floor noise. In addition, the residents who have acquired this quietness will have a feeling of appreciation for neighbors'consideration. So if they are requested to be considerate from the neighbors in the future, they are also more willing to be considerate for their neighbors, which is a virtuous cycle of consideration.

The apparatus 700 of the embodiment of FIG. 14 replaces AI speakers by smart TVs 711 and 712. The smart TVs 711 and 712 have a voice recognition function through a microphone embedded in a remote control. They may also include an STT module, an NLU module, and a reconciliation module. Alternatively, if there is no STT module, NLU module, or reconciliation module, a separate AI server 720 may provide these modules.

As a usage scenario, when a resident upstairs receives a request to refrain from generating the inter-floor noise from the neighbor downstairs while watching the TV 712, a message containing the request may be sounded or visually displayed under the screen of the smart TV 712. If the request is received while the TV 712 is turned off, the TV 712 is turned on and the consideration request message may be sound and/or visually displayed on the TV 712. Most of the smart TVs 711 and 712 are in front of a sofa in a living room, and have a large screen, thus improving visibility of neighbors'status information and enhancing communication.

In addition, only by updating a software or firmware of an conventional smart TV having a voice recognition function to have a STT module, a NLU module, and a reconciliation module, the conventional smart TV can be used as an AI-based data processing apparatus between neighbors according to the present invention. Alternatively, by updating the software or firmware of the conventional smart TV having the voice recognition function to work with an AI server according to the present invention, it can be used as an AI-based data processing apparatus between neighbors according to the present invention.

FIG. 15 illustrates an inter-floor information map used for pairing connection among AI-based data processing apparatuses.

In an embodiment of the pairing connection, the inter-floor information map 50 in the apartment house may be generated based on information provided by a user when registering the service according to the invention. The inter-floor information map 50 can be generated in various ways. For example, it may be generated by a service operator or automatically generated through an algorithm. Hereinafter, a process in which the inter-floor information map 50 is generated will be described in detail using the AI speaker as an example.

When registering an AI speakers product or signing up for a mutual consideration service between neighbors, the information necessary for pairing connection can be obtained upon the users consent. This information may include a name of an apartment, a house number, an IP address, and a MAC address of the AI speaker. The inter-floor information map 50 may be generated for each housing. Based on the information received from users, the inter-floor information map 50 may be configured by mapping the IP address and the MAC address information of the device used with the corresponding house number of the apartment.

Thus, if a status information of a house (e.g., House #1 on the first floor) is 'I want you to be quiet because the upper floor is noisy', the IP address and MAC address of House #1 on the second floor which is upstairs of House #1 on the first floor are referred, and the AI speakers of the Houses #1 on the 1st floor and 2nd floor are connected in a pair. Here, the pairing connection may be performed through a wired or wireless network using the IP address and/or the MAC address, or through IoT communication using a ZigBee or the like.

As another embodiment of the pairing connection, an algorithm may generate an inter-floor information map 50 based on inter-floor noise event information and response information of each occupant occurring in the apartment. Hereinafter, the algorithm which generates the inter-floor information map 50 will be described in detail by taking an AI speaker as an example.

Each house may be equipped with a vibration/noise sensor and/or a camera capable of image analysis to detect inter-floor noise event information and/or resident's reaction information. Suppose, for example, that the status information of "I want you to keep quiet because the upper floor is noisy" is output from the house #1 on the first floor. It is very likely that the house where the noise-related event was detected at that point is the House #1 on the second floor. The noise-related event may be an event in which the highest vibration/noise level was detected, a running motion was detected, or both vibration/noise and motion were detected at the same time point as the status information was output. The inter-floor information map 50 may be configured by matching the IP address and MAC address of the AI speaker on the House #1 on the first floor with the IP address and MAC address of the AI speaker on the House #1 on the second floor. In this way, the inter-floor information map 50 can be generated for other houses in the apartment.

Another embodiment for pairing connection of AI speakers of neighbors in an AI-based data processing apparatus is described below.

A pair of AI speakers pre-registers information necessary for pairing connection with respect to the inter-floor noise information. For this, short-range wireless communication protocols such as Bluetooth, ZigBee, Radio Frequency IDentification (RFID), UltraWideBand (UWB), Near Field Communication (NFC), and Wi-Fi Direct can be used. Taking Bluetooth as an example, when the Bluetooth function of a pair of first and second devices is activated, each of the first device or the second device searches for a peripheral device to be connected to Bluetooth, selects another device of the pair, and connects in a pair by automatically entering the secret key (identification information). If Wi-Fi Direct is taken as an example, when the first device pushes the connection request message and the second device accepts the connection request, the first and second devices are connected to communicate with each other.

On the other hand, if one-to-many (1 to N) connections are possible, such as in Bluetooth and Wi-Fi Direct, multiple devices may be connected at the same time if multiple devices accept the connection request. If information on house number is stored in any form for each device, it is possible to deliver statements only to the device installed in houses relevant to the statements by analyzing the request of the speaker as to the inter-floor noise.

As such, by automatically performing pairing connection between the devices of neighbors related to the inter-floor noise based on the information on the speaker and statements as to the inter-floor noise and identification information of devices, information such as inter-floor related requests to neighbors can be communicated quickly, conveniently, and accurately, thereby being able to prevent disputes inter-floor noise between neigbhors.

FIG. 16 illustrates an example in which an AI-based data processing apparatus according to another embodiment of the present invention can be utilized.

The AI speaker 810 will be described as an example of as the AI-based data processing device. In a case where an user submits a complaint to a related person or organization, when the complaint is explained by the user to the AI speaker 810, the AI speaker 810 converts the statements of the user into text and deduces its meaning. Thereafter, the AI speaker 810 can reconstruct the statements and convert it in an appropriate and polite manner through a machine learning model. The AI speaker 810 may be configured to search for a recipient or an institution to which a complaint should be delivered based on the content of the complaint.

For example, when a construction noise occurs in an apartment where a baby is sleeping, let's suppose the baby's mom complains to the AI speaker 810 at house like "My baby has been sick and just fell asleep, but I am afraid that he might wake up because of the construction noise." The AI speaker 810 understands the meaning and reconstructs it into a softened expression and/or image. And when the apartment management office 850 is set as a destination from the content of this complaint, the reconstructed expression and/or image can be sent or displayed in the AI speaker 820. For example, along with a picture or avatar image that shows the appearance of a sleeping child, a soft voice of the expression "Please tell the house under construction to comply with a permitted construction time, otherwise it would be difficult to sleep the child due to the construction noise") can be output at the same time. Meanwhile, since it is difficult to specify the house in which the noise generated, the output can be broadcasted to all AI speakers (not shown) connected in 1:N. Alternatively, it may be configured to output to an AI speaker or a complaint processing system installed in a designated inter-floor noise neighboring center or an apartment management office 850.

As another example, if a volume of outdoor notification speakers installed at school is too loud so as to incur inconveniences to nearby residents, the complainant, instead of make a complaint by phone or writing to the school or the school district, will speak to a AI speaker at his house. The AI speaker 810 may be controlled to infer the content of the recognized speech, then reconciliate it and transmit only the necessary reconciliated expression to the relevant institution. For doing so, the AI speaker 810 can be programmed to analyze a meaning of the complaint content, reconstruct it into a reconciliated expression through an AI model, and then search the authorities for the relevant complaint on the internet in which the complaint in text or voice is filed. When a complainant wants to file complaints regarding various inconveniences such as noise near residents, dust during construction, and illegal structures on pedestrian paths, the complainant had to visit in person or call by phone or file in writing. There was a problem in which emotion can be intensified when faced in person or talking on the phone. In the case of writing, there was a problem that it took a long time from filing a complaint to receiving the reply, and it was difficult to deliver details. However, the present invention overcomes these shortcomings of face-to-face complain and the disadvantages of written complaint, and has an advantage of delivering complaints simply, quickly and accurately. In addition, for those who lack expertise in filing complaints, they can reconstruct them into persuasive complaints by supplementing the content automatically through an AI model that have learned relevant information or cases. In addition, in the case of abusive complaints based on personal prejudice or subjective judgment, the AI speaker can provide feedback to the complainants and give them an opportunity to reconsider, thereby preventing the abuse of complaints. The AI-based data processing apparatus between neighbors according to the present inventions described above has a display screen to visually display the state of the inter-floor neighbor. For example, if a resident downstairs makes an annoying request for refraining inter-floor noise to neighbor upstairs, the AI speakers screen upstairs can display the status of the neighbors downstairs in a predetermined color or text. As the visual signal continues to be displayed, one can always check the current status of his/her neighbors as to the inter-floor noise even if one have not heard the sound of the current status of his/her neighbors.

The AI speaker 11, 12 and/or AI server 20 of the present invention may be implemented as a smartphone app. Specifically, the first AI speaker 11 may be implemented in the smartphone app of residents downstairs, and the second AI speaker 12 may be implemented in the smart phone app of residents upstairs. If the function of the reconciliation module of the AI server 20 according to the embodiments of the present invention is implemented in the smartphone app, the invention can be implemented without a separate AI server. Only one of a pair of the data processing devices may be replaced by the smartphone app. Alternatively, the pair of the data processing devices 11 and 12 may be implemented in a form embedded in a smart home system built in an apartment instead of a standalone device.

As another embodiment implemented by the smartphone app, the residents downstairs may input their state related to inter-floor noise as a text instead of voice in the first smartphone app. It may be directly transmitted to the second smartphone app of the residents upstairs. In addition, by including the reconciliation module, the meaning of the text input by the residents downstairs is understood and conveyed. But it is converted into a soft and smooth expression. The output from the smartphone app of the residents upstairs can be in a form of text, image, or voice.

On the other hand, it is also possible to implement the present invention in the form of a movable helper robot platform. The robot can visit the user in the house and output the information received from the neighbors, so effective delivery of the information is possible.

The various techniques described herein can be controlled by hardware or software, or a combination of hardware and software. All modifications and variations belonging to the true spirit and scope of the present invention are intended to be covered by the following claims.

What is claimed is:

1. An apparatus for processing data between neighbors based on artificial intelligence comprising:
 a first communication device configured to receive first data expressing a state of a first neighbor as to inconveniences; and
 a second communication device configured to output second data to a second neighbor spatially apart from the first neighbor,
 wherein the first data is an oral or written expression indicating a degree of acceptance of the first neighbor as to the inconveniences,
 wherein based on the artificial intelligence, the second data is selectively converted from the first data into a different expression that is softened while still indicating a state of request for suppressing the inconveniences, or an another different expression while still indicating a state of accepting the inconveniences, according to a meaning of the first data,
 wherein the artificial intelligence includes a natural language understanding module configured to analyze the meaning of the first data, and the artificial intelligence includes a reconciliation module configured to selectively convert the first data to the second data of different expression while maintaining the meaning,
 wherein the reconciliation module includes an artificial intelligence model configured to be trained with training data sets consisting of input data and output data, and
 wherein the input data includes information related to a request of the first neighbor for quietness, information related to consideration of the first neighbor, information related to occurrence of the inconveniences caused, and information related to reaction of the second neighbor to the outputted second data, and
 wherein the inconveniences are caused by the second neighbor.

2. The apparatus of claim 1, wherein the meaning of the first data consists of a request-for-quietness mode in which the first neighbor requests the second neighbor to refrain from making inter-floor noise and a considerate mode in which the inter-floor noise is acceptable to the first neighbor.

3. The apparatus of claim 2, wherein the second data includes at least one of audio data and visual data, and when both the audio data and the visual data are output, a time during which the visual data is displayed on is longer than a time during which the audio data is output.

4. The apparatus of claim 2, wherein when the meaning of the first data represents the considerate mode, the second data is represented by at least the visual data, and the visual data is displayed on for a predetermined period before another first data representing the state of the first neighbor is received by the second communication device.

5. The apparatus of claim 1, wherein the training data sets are data extracted from inter-floor noise dispute mediation cases.

6. The apparatus of claim 1, wherein the second communication device automatically switches to an input standby mode for receiving feedback from the second neighbor after the second data is output from the second communication device.

7. An apparatus for processing data between neighbors based on artificial intelligence comprising:
- a first communication device configured to receive first data expressing a state of a first neighbor as to inconveniences; and
- a second communication device configured to output second data to a second neighbor spatially apart from the first neighbor;
- at least one of a noise sensor for measuring the magnitude of inter-floor noise travelled to the first living space and a camera module capable of photographing an image in the first living space for image analysis,
- wherein the first communication device automatically switches to an input standby mode for receiving the first data when either (i) the image analysis of the reaction of the first neighbor to the inconveniences caused by the second neighbor or (ii) level of the inter-floor noise detected by the noise sensor satisfies a predetermined condition for occurrence of the inconveniences,
- wherein the first data is an oral expression indicating a degree of acceptance of the first neighbor as to the inconveniences,
- wherein the second data is converted from the first data into a different expression that is softened while still indicating a state of request for suppressing the inconveniences by use of the artificial intelligence being configured to analyze the meaning of the first data and convert the first data to the second data of the different expression while maintaining the meaning, and
- wherein the inconveniences are caused by the second neighbor.

8. The apparatus of claim 7, wherein each of the first communication device and the second communication device are functionally connected to a camera module having an image analysis function respectively,
- wherein the camera module for the first communication device detects whether a person remains in the living space of the first neighbor and/or performs the image analysis of reaction of the first neighbor to the inconveniences caused by the second neighbor, and
- wherein the camera module for the second communication device detects whether a person remains in the living space of the second neighbor and/or performs the image analysis of the inconveniences caused by the second neighbor.

9. The apparatus of claim 7, wherein the first communication device is configured to present the converted second data to the first neighbor for confirmation from the first neighbor and transmit it to the second communication device upon the confirmation.

10. The apparatus of claim 7, wherein a first communication device installed in a living space in which the inconveniences are detected and a second communication device through which the request-for-quietness is transmitted to the second neighbor are communicatively connected to each other.

11. An apparatus for processing data between neighbors based on artificial intelligence comprising:
- a first communication device configured to receive first data expressing a state of a first neighbor as to inconveniences; and
- a second communication device configured to output second data to a second neighbor spatially apart from the first neighbor;
- wherein the second communication device for the second neighbor in a second living space to be paired and communicatively connected with the first communication device for the first neighbor in the first living space is determined based on (i) information on a noise source map in which sources of the inconveniences and residents related thereto are stored in association, and (ii) information on identification of the first neighbor requesting quietness,
- wherein the first data is an oral or written expression indicating a degree of acceptance of the first neighbor as to the inconveniences,
- wherein the second data is converted from the first data into a different expression that is softened while still indicating a state of request for suppressing the inconveniences by use of the artificial intelligence being configured to analyze the meaning of the first data and convert the first data to the second data of the different expression while maintaining the meaning, and
- wherein the inconveniences are caused by the second neighbor.

12. The apparatus of claim 11, wherein the pairing connection is made based on an inter-floor information map in which information on identification of a resident or a living space and information on identification of the communication device are stored in association.

13. A method of processing data between neighbors based on artificial intelligence comprising:
- receiving, by a processor executing computer-executable instructions, first data expressing a state of a first neighbor as to inconveniences; and
- converting the first data and generating second data to be output to a second neighbor spatially apart from the first neighbor;
- wherein the first data is an oral or written expression indicating a degree of acceptance of the first neighbor as to the inconveniences,
- wherein based on the artificial intelligence, the second data is selectively converted from the first data into a different expression that is softened while still indicating a state of request for suppressing the inconveniences, or an another different expression while still indicating a state of accepting the inconveniences, according to the meaning of the first data, and
- wherein the artificial intelligence includes a natural language understanding module configured to analyze the meaning of the first data, and the artificial intelligence includes a reconciliation module configured to selectively convert the first data to the second data of different expression while maintaining the meaning,
- wherein the reconciliation module includes an artificial intelligence model configured to be trained with training data sets consisting of input data and output data,
- wherein the input data includes information related to a request of the first neighbor for quietness, information related to consideration of the first neighbor, information related to the occurrence of the inconveniences caused, and information related to the reaction of the second neighbor to the outputted second data, and
- wherein the inconveniences are caused by the second neighbor.

14. A method of processing data between neighbors based on artificial intelligence comprising:

receiving, by a processor executing computer-executable instructions, first data expressing a state of a first neighbor as to inconveniences; and converting the first data and generating second data to be output to a second neighbor spatially apart from the first neighbor;

wherein the first data is an oral expression indicating a degree of acceptance of the first neighbor as to the inconveniences, wherein the second data is converted from the first data into a different expression that is softened while still indicating a state of request for suppressing the inconveniences by use of the artificial intelligence being configured to analyze the meaning of the first data and convert the first data to the second data of the different expression while maintaining the meaning, wherein the processor is automatically switched to an input standby mode for receiving the first data when either (i) analysis of the reaction image of the first neighbor captured by a camera module to the inconveniences caused by the second neighbor or (ii) level of the inter-floor noise detected in the first living space by a noise sensor satisfies a predetermined condition for occurrence of the inconveniences, and wherein the inconveniences are caused by the second neighbor.

15. A method of processing data between neighbors based on artificial intelligence comprising:

receiving, by a processor executing computer-executable instructions, first data expressing a state of a first neighbor as to inconveniences;

determining the second communication device for the second neighbor in a second living space to be paired and communicatively connected with the first communication device for the first neighbor in the first living space; and converting the first data and generating second data to be output to a second neighbor spatially apart from the first neighbor;

wherein the step of determining is based on (i) information on a noise source map in which sources of the inconveniences and residents related thereto are stored in association, and (ii) information on identification of the first neighbor requesting quietness, wherein the first data is an oral or written expression indicating a degree of acceptance of the first neighbor as to the inconveniences, wherein the second data is converted from the first data into a different expression that is softened while still indicating a state of request for suppressing the inconveniences by use of the artificial intelligence being configured to analyze the meaning of the first data and convert the first data to the second data of the different expression while maintaining the meaning, and wherein the inconveniences are caused by the second neighbor.

* * * * *